United States Patent
Jiang et al.

(10) Patent No.: US 8,306,336 B2
(45) Date of Patent: Nov. 6, 2012

(54) LINE OR TEXT-BASED IMAGE PROCESSING TOOLS

(75) Inventors: Xiaoyun Jiang, San Diego, CA (US); Chinchuan Andrew Chiu, San Diego, CA (US); Shuxue Quan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1130 days.

(21) Appl. No.: 11/436,470

(22) Filed: May 17, 2006

(65) Prior Publication Data

US 2007/0268501 A1    Nov. 22, 2007

(51) Int. Cl.
*G06K 9/68* (2006.01)
(52) U.S. Cl. ........................................ 382/219
(58) Field of Classification Search ................ 382/130, 382/177
See application file for complete search history.

(56) References Cited

U.S. PATENT DOCUMENTS

| | | | | |
|---|---|---|---|---|
| 4,823,194 | A | | 4/1989 | Mishima |
| 5,528,290 | A | * | 6/1996 | Saund ........................ 348/218.1 |
| 5,889,885 | A | * | 3/1999 | Moed et al. ................... 382/172 |
| 6,128,108 | A | * | 10/2000 | Teo ............................. 358/540 |
| 6,175,663 | B1 | * | 1/2001 | Huang .......................... 382/284 |
| 6,301,386 | B1 | | 10/2001 | Zhu et al. |
| 6,480,624 | B1 | | 11/2002 | Horie et al. |
| 6,577,762 | B1 | | 6/2003 | Seeger et al. |
| 6,674,444 | B1 | * | 1/2004 | Tahara .......................... 345/589 |
| 6,721,461 | B1 | * | 4/2004 | Nichani ........................ 382/270 |
| 6,748,111 | B1 | * | 6/2004 | Stolin et al. ................... 382/176 |
| 7,171,056 | B2 | | 1/2007 | Zhang et al. |
| 7,184,061 | B2 | * | 2/2007 | Rao .............................. 345/629 |
| 7,283,162 | B2 | | 10/2007 | Silverbrook et al. |
| 2003/0090751 | A1 | | 5/2003 | Itokawa et al. |
| 2004/0081335 | A1 | * | 4/2004 | Kondo et al. ................. 382/107 |
| 2004/0218069 | A1 | | 11/2004 | Silverstein |
| 2007/0133874 | A1 | * | 6/2007 | Bressan et al. ................ 382/181 |
| 2007/0269124 | A1 | | 11/2007 | Li et al. |

FOREIGN PATENT DOCUMENTS

| | | |
|---|---|---|
| CA | 2593630 A1 | 5/2006 |
| CN | 1401106 | 3/2003 |
| CN | 1606033 A | 4/2005 |
| DE | 102004054131 | 5/2006 |
| JP | 63153682 A | 6/1988 |
| JP | 3264932 A | 11/1991 |
| JP | 06024014 | 3/1994 |
| JP | 7271907 A | 10/1995 |
| JP | 8087594 A | 4/1996 |
| JP | 10143607 A | 5/1998 |

(Continued)

OTHER PUBLICATIONS

International Search Report—PCT/US07/068812—International Search Authority—European Patent Office, Feb. 25, 2008.
Eagle, et al., "Projection Method for Edge and Corner location for Image Extraction" IP.COM Journal, IP.COM Inc., West Henrietta, NY, US. Mar. 1, 1995, pp. 1-5, XP013103035.

(Continued)

*Primary Examiner* — Alex Liew
(74) *Attorney, Agent, or Firm* — Timothy F. Loomis; James R. Gambale, Jr.

(57) ABSTRACT

In accordance with one embodiment of the disclosure, apparatus are provided, including an image processor, a unique image processing mechanism, and a unique image processing activation mechanism. The image processor includes the unique image processing mechanism, which processes a certain type of image. The unique image processing activation mechanism causes the unique image processing mechanism to process a given image.

30 Claims, 4 Drawing Sheets

FOREIGN PATENT DOCUMENTS

| | | |
|---|---|---|
| JP | 2875454 B2 | 3/1999 |
| JP | 2001223903 | 8/2001 |
| JP | 2003150964 A | 5/2003 |
| JP | 16-094947 | 3/2004 |
| JP | 2004212311 A | 7/2004 |
| JP | 2004362541 A | 12/2004 |
| JP | 2006085463 A | 3/2006 |
| JP | 2007164785 A | 6/2007 |
| JP | 2007228281 A | 9/2007 |
| KR | 2005-121718 | 12/2005 |
| WO | WO200648117 | 5/2006 |

OTHER PUBLICATIONS

Zhang, et al., "Notetaking with a camera; whiteboard scanning and image enhancement" Acoustics, Speech, and Signal Processing, 2004. Proceedings, (ICASSP '04). IEEE International Conference on Montreal, Quebec, Canada, May 17-21, 2004, Piscataway, NJ, USA.

Zhang, et al., "Whiteboard It! Convert Whiteboard Content into an Electronic Document", Microsoft Research, Aug. 12, 2002, pp. 1-16.

Written Opinion—PCT/US07/068812, International Searching Authority—European Patent Office, Feb. 25, 2008.

* cited by examiner

LINE OR TEXT-BASED IMAGE PROCESSING TOOLS

COPYRIGHT NOTICE

This patent document contains information subject to copyright protection. The copyright owner has no objection to the facsimile reproduction by anyone of the patent document or the patent, as it appears in the US Patent and Trademark Office files or records, but otherwise reserves all copyright rights whatsoever.

FIELD OF THE DISCLOSURE

Aspects of the present disclosure relate to image processing of whiteboards, blackboards, or documents with lines or text forming objects. Other aspects of the disclosure relate to certain types of embedded devices, such as mobile phones with image capturing features, and specifically, with whiteboard or blackboard capturing features.

BACKGROUND

Various types of documents and images are used in different contexts. For example, whiteboards are frequently used during discussions, meetings, and to exchange ideas. Blackboards are also used. In many situations, the image may be captured, for example, by a camera, but the captured digital image may have a poor quality. For example, the image background may include distortions, shading, and other information that makes it difficult to view.

SUMMARY

In accordance with one embodiment of the present disclosure, apparatus are provided. The apparatus include an image processor which includes a unique image processing mechanism to process a certain type of image. A unique image processing activation mechanism is provided to cause the image processing mechanism to process the given image.

BRIEF DESCRIPTION OF THE DRAWINGS

The present disclosure is further described in the detailed description which follows, by reference to the noted drawings by way of non-limiting example embodiments, in which like reference numerals represents similar parts throughout the several views of the drawings, and wherein.

DETAILED DESCRIPTION

Aspects of the present disclosure are directed to a camera with a blackboard and/or whiteboard cleanup mechanism, to cleanup or remove distortions in the background of a captured digital image of the blackboard or the whiteboard. Other aspects of the disclosure may be directed to document processing, such as features for performing image processing on documents that include, for example, text, and other line representations of information. Such a document may include distorted or unwanted background information that impedes the ability to view the information in the document. For example, a photocopy of a document may result in streaks in a reproduced version of the document. The document with the streaks may be reproduced to form a captured digital image of the document. The background may be separated and subtracted out or removed, leaving the desired foreground information in the resulting image.

Other aspects of the disclosure are directed to a mobile device, for example, a mobile phone, which includes a camera. Further aspects of the disclosure are directed to such a mobile device combined with a camera, where the device includes a special blackboard and/or whiteboard cleanup mechanism. The device may be further provided with a cleaned up image transmission mechanism to transmit the cleaned up image to a recipient, to a remote server, or to a remote website.

The embedded device may be a camera. Alternatively, the embedded device may be a mobile communications device, for example, a mobile phone with voice transmission capabilities combined with a camera or including a camera. Rather than an embedded device, a larger apparatus may be provided, such as a document facsimile reading apparatus or a photocopier machine. The device may be a business card reader, a bar code scanner, and/or a document scanner. Each of these devices may be provided with a document cleanup mechanism to remove or separate out the undesired background information from a text or line-based image, to render the resulting processed image with better presented foreground information.

Figure 1:
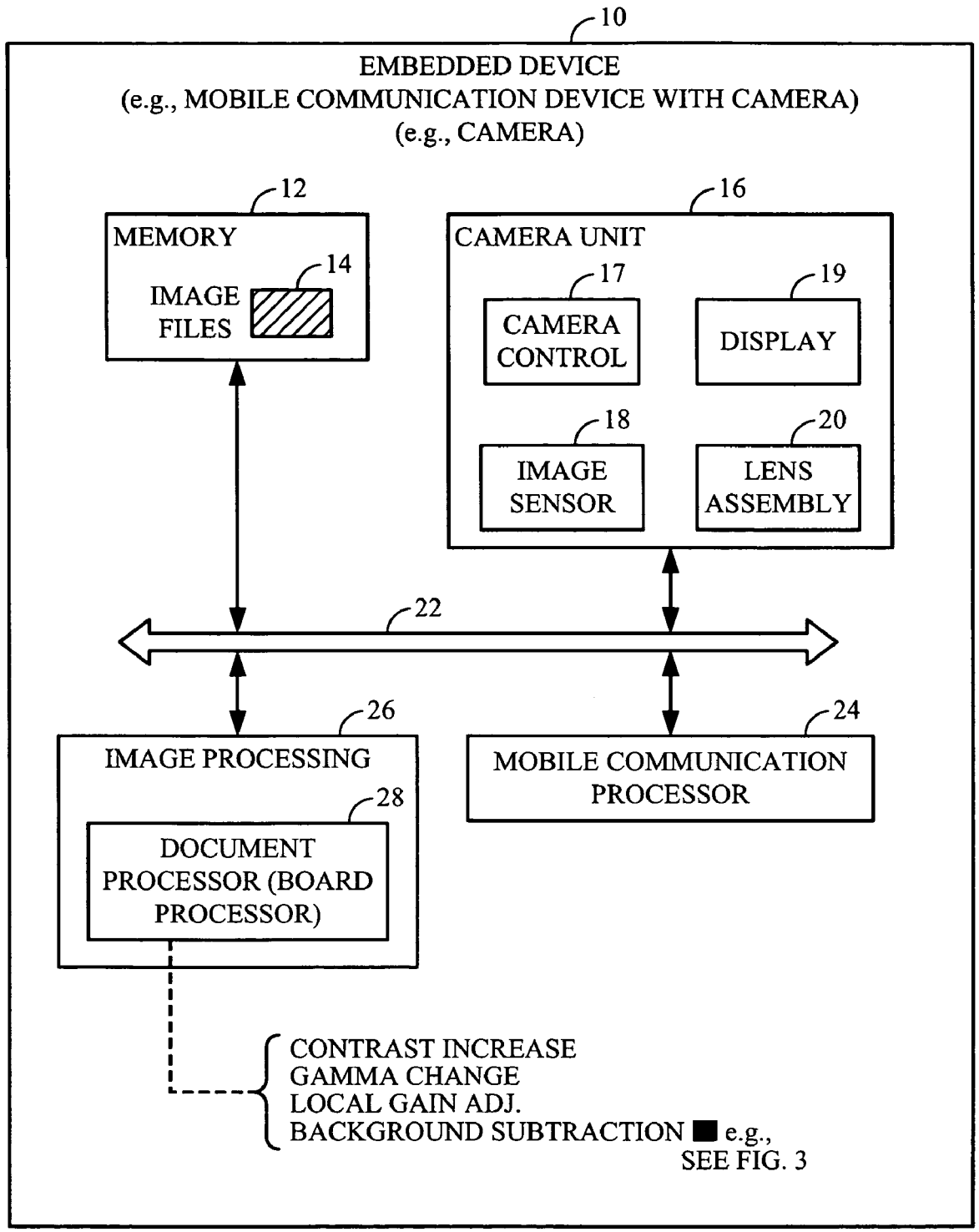
FIG. 1 is a block diagram of an embedded device 10, which includes a board processor among other features in accordance with one embodiment of the disclosure.

Referring now to the drawings in greater detail, FIG. 1 is a block diagram of an embedded device 10. The illustrated embedded device 10 includes, for example, a mobile communications device with a camera. Alternatively, the device may be a camera itself, or it may be another type of device, for example, as noted above. In this specific embodiment, the embedded device is a mobile phone with a camera. The illustrated device 10 includes a memory 12, which holds image files 14, a camera unit 16, an image processor 26, and a mobile communication processor 24. These components are coupled to each other via a data bus 22.

The camera unit 16 includes a camera control 17, an image sensor 18, a display 19, and a lens assembly 20. The image processing component or image processor 26 includes a document processor 28. In the illustrated embodiment, document processor 28 is a board processor, for example, a whiteboard processor or a blackboard processor. Document processor 28 includes a unique image processing mechanism to process a certain type of image. That type of image may be a document with predominantly lines and text describing information to be portrayed by the document. The type of document may be black and white documents specifically, with lines and text. The document processor may be tailored to process captured digital images of business cards. In accordance with the specific embodiment described, the document processor 28 is tailored to process whiteboards and/or blackboards.

The unique image processing mechanism of document processor 28 may include a contrast increasing mechanism, a gamma changing mechanism, a local gain adjustment mechanism, or a background subtraction mechanism. Each of these image processing mechanisms may result in a substantial separation or removal of unwanted distracting background information from a captured digital image of the document to be processed.

Figure 2:
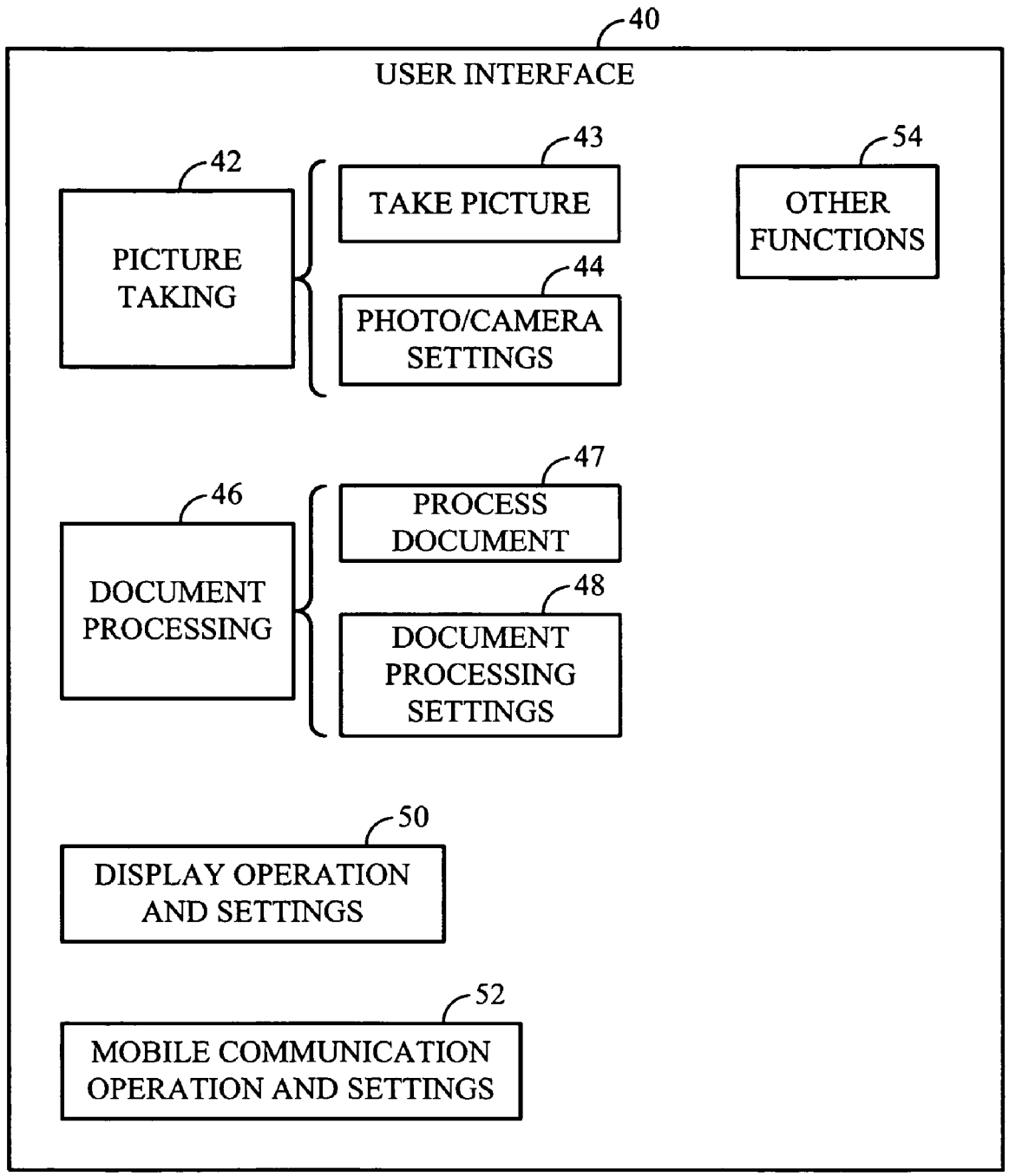
FIG. 2 is a functional schematic diagram of a user interface of the embedded device shown in FIG. 2.

FIG. 2 is a functional schematic block diagram of a user interface 40 of the embedded device 10 shown in FIG. 1. The illustrated user interface 40 includes a picture taking interface component 42, a document processing interface component 46, and a display operation and settings interface component 50. In addition, the illustrated interface 40 may include a mobile communication operation and settings interface component 52 and other functions interface component 54.

Picture taking interface component 42 may include portions which pertain to taking a picture 43 and which pertain to photograph and camera settings 44.

Document processing interface component 46 may include portions which pertain to processing a document 47 and to defining certain document processing settings 48.

Each of these interface components may include, for example, a display or notification mechanism for communicating information to a user. For example, a sound, light, or displayed text or image information may be presented to the user presenting the user with certain information concerning the interface component function and the status of the embedded device pertaining to that function. In addition, each of the interface components shown may include an input or an activation mechanism for activating a particular function of the device or for inputting information into the device, for example, to change settings of one or more functions of the device.

Figure 3:
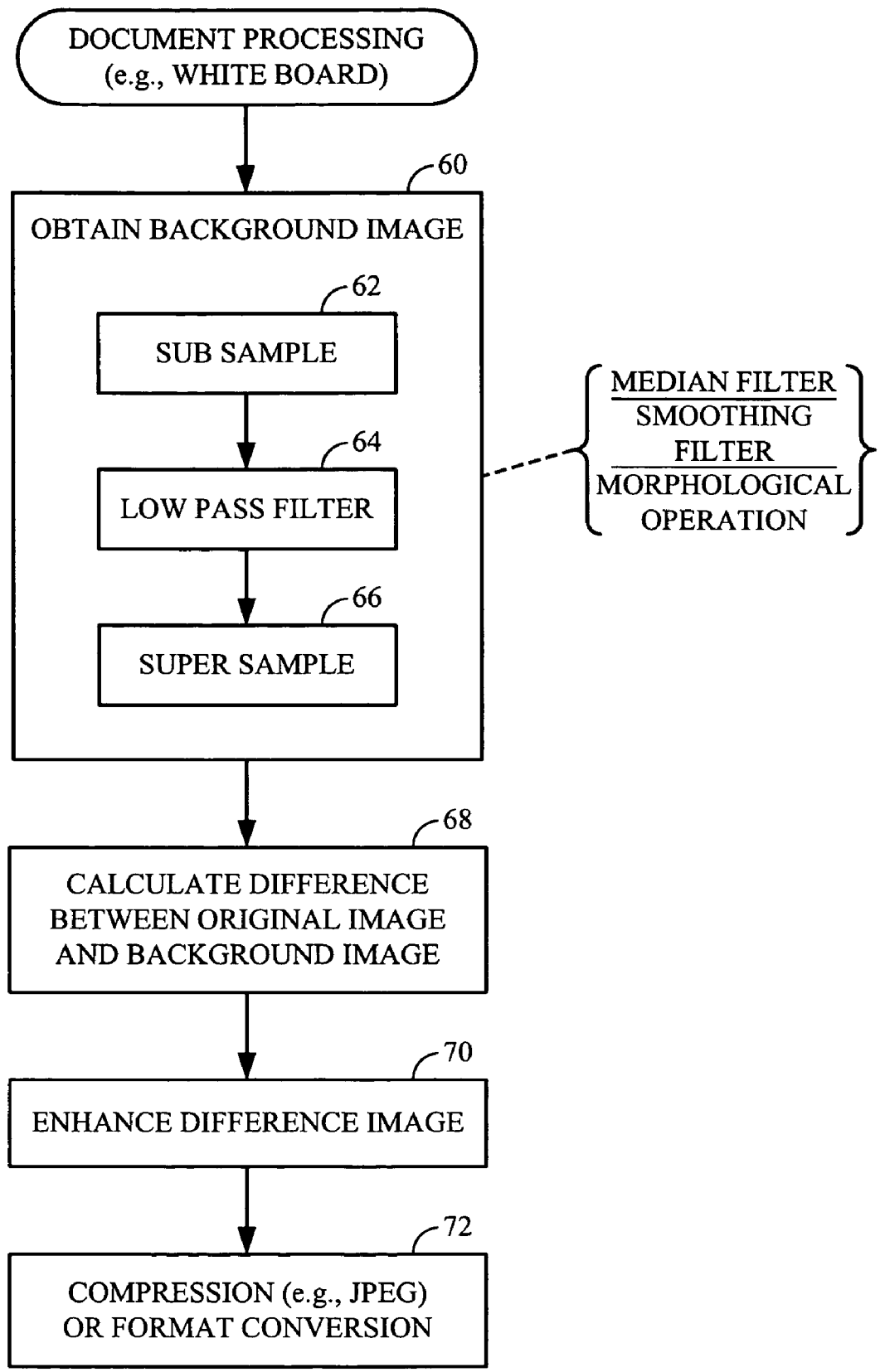
FIG. 3 depicts a flow chart of a document processing process performed by the document processor illustrated in FIG. 1.

FIG. 3 depicts a flow chart of a document processing component, where the document is, for example, a whiteboard. The illustrated process involves obtaining a background image at act 60, and subsequently calculating a difference between the original image and the background image at act 68. The difference image may then be enhanced at act 70, and compressed at act 72. In addition, the format of the resulting image may be converted at act 72. When the document is compressed it may be compressed, for example, into the form of a JPEG format image.

In obtaining the background image at act 60, the given image to be processed may be subsampled at act 62, after which a low pass filter may be applied to the subsampled image at act 64. After applying low pass filter at act 64, the resulting pixel information of the image may be supersampled at act 66. Note that, instead of applying a low pass filter operation at act 64, a morphological operation may be performed.

The image being processed, in the process shown in FIG. 3, is generally a digital captured image, in this case a whiteboard image. Accordingly, the image at each stage generally includes a pattern of pixels, for example, an array of pixels, where each pixel includes one or a plurality of different color components, with the intensity of each color component, for example, being represented in terms of a magnitude value.

In addition or instead of the specific acts 62, 64, and 66, in obtaining a background image, one or a combination of a median filter, a smoothing filter, and a morphological operation may be utilized to process the original image to obtain the background image therefrom.

Figure 4:
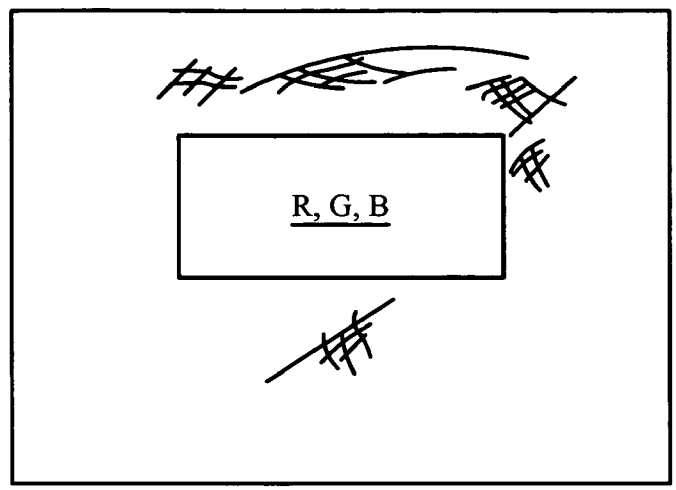
FIG. 4 shows a simplified drawing of a captured whiteboard image with distortions in the background of the image.
Figure 5:
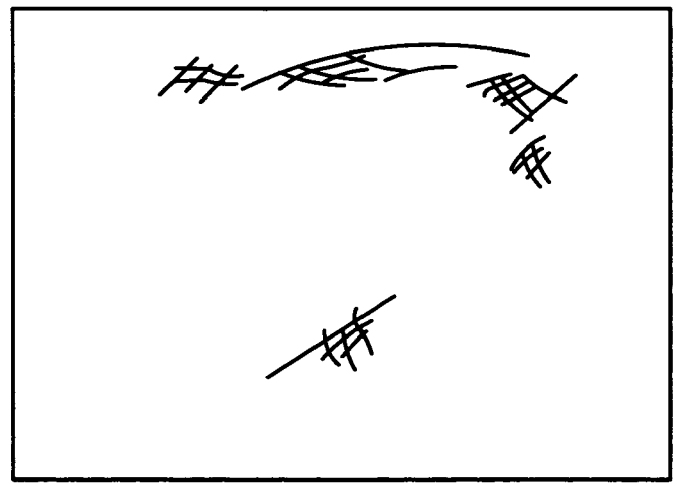
FIG. 5 is a simplified drawing of the background separated from the image shown in FIG. 4.
Figure 6:
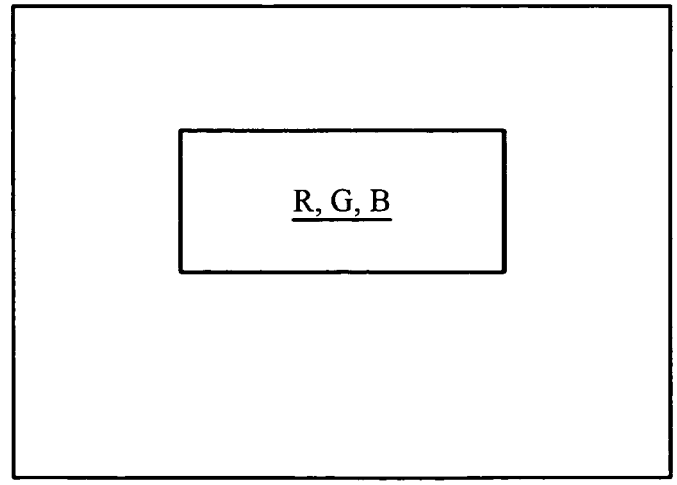
FIG. 6 is a simplified drawing of a resulting processed version of the image shown in FIG. 4, whereby the background, separated as shown in FIG. 5, has been subtracted or removed.

FIG. 4 is a simplified diagram of an original digital captured image of a whiteboard, which includes distorted or undesired background information. FIG. 5 is simplified diagram of a separated out background image obtained from the image in FIG. 4. FIG. 6 is the resulting processed image, whereby the undesired background information has been removed. FIGS. 4-6 are simplified for the explanations herein. The content in these figures, e.g., the R, G, B in FIG. 6, may contain shading along with distortions to that shading within the content. The illustrated processes can remove these background distortions within the content as well.

When a digital captured image is obtained by, for example, photographing a whiteboard or another type of document, distortions and dimming may occur in the background of the resulting captured image. For example, background inconsistencies may be caused by variations in illumination and lens non-uniformity. Some parts of the documents may be bright, and other parts may be dark.

The processing performed, for example, in FIG. 3, may be on an image in the (Y,Cb,Cr) space rather than in the (R,G,B) space. This is because saved images may more frequently be in a JPEG mode. Accordingly, the processing referred to in FIG. 3 may be generally focused on the Y channel. The methods described here may be applied to any image format, and can be applied to the (R,G,B) space as well.

A specific embodiment will now be described in further detail based on the (Y,Cb,Cr) space. In an initial task of the process, the background is obtained by removing the foreground contents from the captured digital image of a whiteboard. This may be done, for example, if the whiteboard foreground contains generally thin lines, through morphological operation such as "dilate" and "erode". Alternatively, the foreground information may be removed by subsampling the image and applying a median filter to the image. Subsampling of the image and filter processing can be performed with multi-scaling steps to improve the results.

Some benefits resulting from subsampling, filtering, and subsequent supersampling include the more thorough removal of foreground information from the whiteboard. Contents in the foreground, including generally thin lines, cover a limited amount of pixels. By performing a high subsampling ratio, this information can be easily removed. For example, for an image size with 1280×960, a subsampling ratio as high as 16 may be utilized. The subsampled image will have a size of only 80×60. In the small downsized image, contents in the whiteboard have been removed to some degree. Another benefit of a large degree of downsizing is that subsequent filter processing with a small kernel can be used to effectively remove the foreground contents. For example, the kernel may be as small as 3×3. In addition, because the downsized image is very small, the cost (i.e., processing memory needs) of the subsequent filtering processing is reduced.

A "nearest neighbor" method may be used to perform the subsampling, or another interpolation method may be utilized.

After subsampling, some foreground information may still exist in the image. At this point, for example, a simple 3×3 median filter may be applied to the subsampled image to further remove the foreground contents. To provide better effects, the median filter may be applied several times in order to totally remove the foreground contents and to obtain a whiteboard background image. A 3×3 smoothing filter may also be used to remove the foreground content.

After performing a median filter processing, the subsampled background image has now been obtained. In order to have an image that corresponds to the original sample resolution of the original image, the image is supersampled to the original resolution. In order to do this, a bilinear interpolation method may be used to obtain a smooth interpolation. Other interpolation methods can also be used, for example, bicubic, spline, or various types of smoothing interpolation methods.

When processing a whiteboard, the original image may be subtracted from the background image to obtain the foreground content. At this point, a content image is obtained. The content image can be enhanced through the use of a ratio multiplication. The ratio can be determined, for example, by modifying settings, e.g., utilizing a document processing settings interface component 48 as shown in FIG. 2. Generally, the ratio may be between two and five. A threshold may be applied to the image at this point so that pixels having a value below the threshold are treated as noise and will not be amplified.

After the enhanced content image is obtained, it may be subtracted from a pure white image, resulting in an image that corresponds to the recovered now clean whiteboard image.

For color channels in the content image, in order to keep the hue unchanged, the ratio between Cb and Cr should not be changed. On the other hand, in order to obtain brilliant and vivid colors, their saturation may be enhanced. By multiplying the Cb and Cr channels with the same amplification ratio as used on the Y channel (it can also be different), the color saturations may be affectively enhanced.

When processing a blackboard image, the background image may be subtracted from the original image to obtain the content information, and the enhanced signal image may be obtained by subtracting a pure black image. Otherwise, the processes can be the same as those described above for whiteboard images.

The claims as originally presented, and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. An apparatus comprising:
   a digital camera for obtaining a first image comprising a background portion and a foreground portion, wherein the foreground portion comprises written content; and
   a document processor including a background subtraction mechanism, the background subtraction mechanism including a subsample mechanism, a filter mechanism, and a supersample mechanism to subsample, filter, and subsequently supersample the first image to obtain a background image, the background image having the same resolution as the first image, the background subtraction mechanism further including a difference calculator to form an image with pixel values based on respective differences between pixel values in the foreground image and corresponding pixel values in the background image,
   wherein the document processor is configured to remove the background portion from the first image to form a foreground image of the written content, and to enhance the foreground image to obtain an enhanced content image, and to overlay the enhanced content image on a white image or a black image.

2. The apparatus according to claim 1, wherein the apparatus comprises an embedded device, wherein the embedded device comprises the document processor.

3. The apparatus according to claim 1, further comprising an activation mechanism to cause the document processor to process the first image.

4. The apparatus according to claim 1, further comprising a mobile communications device, including a mobile phone.

5. The apparatus according to claim 1, wherein the apparatus comprises one of a document facsimile reading apparatus, a photocopy machine, a business card reader, a bar code scanner, and a document scanner.

6. The apparatus according to claim 1, wherein the first image is a document.

7. The apparatus according to claim 1, wherein the first image is a black and white document including lines and text.

8. The apparatus according to claim 1, wherein the first image is an image of a business card.

9. The apparatus according to claim 1, wherein the first image is an image of at least one of a blackboard and a whiteboard.

10. The apparatus according to claim 9, wherein the first image is an image of a blackboard.

11. The apparatus according to claim 9, wherein the first image is an image of a whiteboard.

12. The apparatus according to claim 9, wherein the apparatus is a mobile phone.

13. The apparatus according to claim 12, wherein the digital camera includes camera elements including an image sensor and lens assembly.

14. The apparatus according to claim 9, further comprising a picture display to display the first image.

15. The apparatus according to claim 12, further comprising a mobile communications processor.

16. The apparatus according to claim 15, wherein the mobile communications processor includes a processor for a mobile phone.

17. The apparatus according to claim 16, wherein the mobile communications processor includes a mechanism to receive and send the first image to or from a separate remote device via a wireless connection.

18. The apparatus according to claim 1, wherein the document processor includes a separate unique image processor, separate from the document processor.

19. The apparatus according to claim 1, wherein the document processor includes a contrast increasing mechanism.

20. The apparatus according to claim 1, wherein the document processor includes a gamma changing mechanism.

21. The apparatus according to claim 1, wherein the document processor includes a local gain adjustment mechanism.

22. The apparatus according to claim 1, wherein the background separator includes one or a combination of a median filter, a smoothing filter, and a morphological operator.

23. An integrated circuit comprising:
   an image processor including a document processor to process a first image from a digital camera comprising a background portion and a foreground portion, wherein the foreground portion comprises written content, wherein the document processor includes a background subtraction mechanism, the background subtraction mechanism including a subsample mechanism, a filter mechanism, and a supersample mechanism to subsample, filter, and subsequently supersample the first image to obtain a background image, the background image having the same resolution as the first image,
   the background subtraction mechanism further including a difference calculator to form an image with pixel values based on respective differences between pixel values in the foreground image and corresponding pixel values in the background image,
   wherein the document processor is configured to remove the background portion from the first image to form a foreground image of the written content, and to enhance the foreground image to obtain an enhanced content image, and to overlay the enhanced content image on a white image or a black image.

24. A method in an embedded device comprising:
  obtaining a first image comprising a background portion and a foreground portion using a digital camera of the embedded device, wherein the foreground portion comprises written content;
  removing the background portion from the first image to form a foreground image of the written content;
  processing the foreground image to obtain an enhanced content image, wherein the processing includes
  performing a background subtraction, the background subtraction including subsampling, filtering, and subsequently supersampling the first image to obtain a background image, the background image having the same resolution as the first image,
  the background subtraction further including calculating a difference to form an image with pixel values based on respective differences between pixel values in a foreground image and corresponding pixel values in the background image; and
  overlaying the enhanced content image on a white image or a black image.

25. A non-transitory machine-readable media storing machine-readable-instructions, the machine-readable-instructions being interoperable with a machine to cause:
  obtaining a first image comprising a background portion and a foreground portion using a digital camera, wherein the foreground portion comprises written content;
  removing the background portion from the first image to form a foreground image of the written content by subsampling, filtering, and subsequently supersampling the first image to obtain a background image having the same resolution as the first image and performing a background subtraction, the background subtraction including calculating a difference to form an image with pixel values based on respective differences between pixel values in a foreground image and corresponding pixel values in the background image;
  processing the foreground image to obtain an enhanced content image; and
  overlaying the enhanced content image on a white image or a black image.

26. An apparatus comprising:
  means for obtaining a first image comprising a background portion and a foreground portion, wherein the foreground portion comprises written content;
  means for processing the first image to form a foreground image of the written content, including means for performing background subtraction processing, the means for performing background subtraction processing including means for separating out a background image from the first image and means for calculating a difference image, wherein the means for separating includes a subsample mechanism, a filter mechanism, and a supersample mechanism to subsample, filter, and subsequently supersample the first image to obtain a background image, the background image having the same resolution as the first image;
  means to enhance the foreground image to obtain an enhanced content image; and
  means for overlaying the enhanced content image on a white image or a black image.

27. The apparatus of claim 1, wherein overlaying the enhanced content image on a white image or a black image comprises subtracting the enhanced content image from a white image.

28. The apparatus of claim 1, wherein overlaying the enhanced content image on a white image or a black image comprises subtracting a black image from the enhanced content image.

29. The method of claim 24, wherein overlaying the enhanced content image on a white image or a black image comprises subtracting the enhanced content image from a white image.

30. The method of claim 24, wherein overlaying the enhanced content image on a white image or a black image comprises subtracting a black image from the enhanced content image.

* * * * *